(12) United States Patent
Fairhurst

(10) Patent No.: US 11,986,742 B2
(45) Date of Patent: May 21, 2024

(54) MANIPULATION SYSTEM FOR THE STIMULATION OF COGNITIVE ABILITIES

(71) Applicant: Angela L. Fairhurst, Los Angeles, CA (US)

(72) Inventor: Angela L. Fairhurst, Los Angeles, CA (US)

(73) Assignee: Geri-Gadgets, Ltd., Los Angeles, CA (US)

( * ) Notice: Subject to any disclaimer, the term of this patent is extended or adjusted under 35 U.S.C. 154(b) by 1334 days.

(21) Appl. No.: 16/523,462

(22) Filed: Jul. 26, 2019

(65) Prior Publication Data

US 2020/0316456 A1 Oct. 8, 2020

Related U.S. Application Data

(60) Provisional application No. 62/830,402, filed on Apr. 6, 2019.

(51) Int. Cl.
| | |
|---|---|
| *G09B 1/00* | (2006.01) |
| *A63F 9/06* | (2006.01) |
| *A63F 13/79* | (2014.01) |
| *A63H 33/00* | (2006.01) |
| *A63H 33/04* | (2006.01) |
| *G07F 17/32* | (2006.01) |

(Continued)

(52) U.S. Cl.
CPC .............. *A63F 9/0666* (2013.01); *A63F 9/06* (2013.01); *A63F 13/79* (2014.09); *A63H 33/00* (2013.01); *A63H 33/04* (2013.01); *G09B 1/00* (2013.01); *G07F 17/32* (2013.01); *G09B 1/02* (2013.01); *G09B 1/32* (2013.01)

(58) Field of Classification Search
CPC ... G09B 1/00; G09B 1/02; G09B 1/32; G09B 1/34; G09B 19/00
USPC .......................................................... 434/93
See application file for complete search history.

(56) References Cited

U.S. PATENT DOCUMENTS

| | | | | |
|---|---|---|---|---|
| 3,442,044 | A | * | 5/1969 | Quercetti .................. A63F 9/12 446/124 |
| 3,487,579 | A | * | 1/1970 | Brettingen ........... A63H 33/086 446/128 |

(Continued)

OTHER PUBLICATIONS

"WonderFoam Dominoes (Amazon.com)", 2016 [retrieved Aug. 23, 2022]. (Year: 2016).*

*Primary Examiner* — Kurt Fernstrom
(74) *Attorney, Agent, or Firm* — Haverstock & Owens, A Law Corporation

(57) ABSTRACT

An object manipulation system comprising a storage device and a plurality of objects, which are configured to be placed within the storage device and separately taken from the storage device. The object manipulation system helps stimulate cognitive abilities of a user and provide quality of life moments without the need for supervision by allowing the user to arrange the items according to one or more arranging cues. The object manipulation system also helps stimulate blood flow of the hands and arms of the user and provides the added stimulating benefits of exercise and flexibility by enabling the user to bend and manipulate one or more manipulative devices of the system. Particularly, in some embodiments, the plurality of objects are bendable and are able to be bent and manipulated as the objects are taken from the storage device and arranged according to the one or more arranging cues.

16 Claims, 15 Drawing Sheets

(51) Int. Cl.
*G09B 1/02* (2006.01)
*G09B 1/32* (2006.01)

(56) References Cited

U.S. PATENT DOCUMENTS

| | | | | |
|---|---|---|---|---|
| 3,651,597 | A * | 3/1972 | Daenen | A63H 33/086 446/124 |
| 4,149,717 | A * | 4/1979 | Seijiro | A63F 9/12 434/259 |
| 4,306,868 | A * | 12/1981 | Hankins | A63F 3/0423 434/167 |
| 4,509,920 | A * | 4/1985 | Kaufmann | G09B 17/00 434/258 |
| 4,910,913 | A * | 3/1990 | Streeter | A47G 7/063 47/72 |
| 4,964,834 | A * | 10/1990 | Myller | A63H 33/086 446/128 |
| 5,035,324 | A * | 7/1991 | Bertrand | B65D 81/361 206/508 |
| 5,066,234 | A * | 11/1991 | LeDesma | G09B 1/06 434/207 |
| 5,139,453 | A * | 8/1992 | Aiken | G09B 19/00 434/259 |
| 5,167,505 | A * | 12/1992 | Walsh | G09B 19/02 434/207 |
| 5,653,621 | A * | 8/1997 | Yao | A63H 33/082 446/128 |
| 5,674,103 | A * | 10/1997 | Bean | A63F 9/0666 220/4.03 |
| 5,733,612 | A * | 3/1998 | Garry | A01G 5/04 434/93 |
| 6,050,044 | A * | 4/2000 | McIntosh | A63H 33/082 446/124 |
| 6,061,955 | A * | 5/2000 | Domstein | A47G 7/063 47/72 |
| 6,190,228 | B1 * | 2/2001 | Hoogenboom | A63H 33/00 446/119 |
| 6,626,678 | B2 * | 9/2003 | Forbes | A63F 9/0666 273/156 |
| 6,755,713 | B1 * | 6/2004 | Weber | A63H 5/00 446/175 |
| D748,204 | S * | 1/2016 | Simonds | D21/500 |
| 9,713,776 | B1 * | 7/2017 | Leung | G09B 1/06 |
| 2002/0068262 | A1 * | 6/2002 | Robinson | G09B 25/08 434/93 |
| 2003/0082986 | A1 * | 5/2003 | Wiens | A63H 33/062 446/120 |
| 2003/0089033 | A1 * | 5/2003 | Wimp, Jr. | A01G 5/04 47/41.11 |
| 2003/0232320 | A1 * | 12/2003 | Lee | G09B 1/30 434/403 |
| 2005/0074728 | A1 * | 4/2005 | Dark | A01G 5/04 434/93 |
| 2005/0144841 | A1 * | 7/2005 | Hjorth | A47G 7/063 47/66.3 |
| 2006/0005438 | A1 * | 1/2006 | Chang | G09F 1/06 40/124.09 |
| 2006/0026896 | A1 * | 2/2006 | Flanagan | A47G 7/063 47/41.01 |
| 2006/0093995 | A1 * | 5/2006 | Brown | G09B 1/36 434/171 |
| 2007/0289212 | A1 * | 12/2007 | Shein | A47G 7/063 47/65.8 |
| 2008/0115412 | A1 * | 5/2008 | Armstrong | B29C 41/36 47/41.01 |
| 2008/0136099 | A1 * | 6/2008 | Frost | A63F 9/10 273/157 R |
| 2008/0197570 | A1 * | 8/2008 | Lewis | A63F 1/00 273/292 |
| 2013/0129262 | A1 * | 5/2013 | Penn | A47G 7/063 383/104 |
| 2019/0183266 | A1 * | 6/2019 | Serna | A47G 7/07 |
| 2022/0062750 | A1 * | 3/2022 | Pogosyan | A63F 9/0666 |

\* cited by examiner

US 11,986,742 B2

MANIPULATION SYSTEM FOR THE STIMULATION OF COGNITIVE ABILITIES

RELATED APPLICATIONS

This Patent Application claims priority under 35 U.S.C. 119(e) of the co-pending U.S. provisional patent application, Application No. 62/830,402, filed on Apr. 6, 2019, and entitled "MANIPULATION SYSTEM FOR THE STIMULATION OF COGNITIVE ABILITIES," which is also hereby incorporated by reference in its entirety.

FIELD OF THE INVENTION

The present invention relates generally to matching and manipulation toys, games and systems. More specifically, the present invention relates to a system for matching, manipulating and sorting a variety of items according to one or more arranging cues.

BACKGROUND OF THE INVENTION

Currently one in nine Americans aged 65 and older has Alzheimers or another form of dementia. Dementia is a degenerative disorder that develops primarily in the nervous system and selectively damages areas of the brain. Typically, there are several stages of dementia, ranging from no impairment, to mild decline, to severe decline. Cognitive and social abilities may be slowly lost as the disease spreads throughout the brain. As dementia develops and persists, it is important for sufferers to maintain cognitive and physical stimulation.

SUMMARY OF THE INVENTION

An object manipulation system comprising a storage device and a plurality of objects, which are configured to be placed within the storage device and separately taken from the storage device. The object manipulation system helps stimulate cognitive abilities of a user and provide quality of life moments without the need for supervision by allowing the user to arrange the items according to one or more arranging cues. The object manipulation system also helps stimulate blood flow of the hands and arms of the user and provides the added stimulating benefits of exercise and flexibility by enabling the user to bend and manipulate one or more manipulative devices of the system. Particularly, in some embodiments, the plurality of objects are bendable and are able to be bent and manipulated as the objects are taken from the storage device and arranged according to the one or more arranging cues.

In one aspect, a manipulation system comprises a storage device and a plurality of objects configured to be placed within the storage device and separately taken out of the storage device, wherein the plurality of objects are arrangeable according to one or more arranging cues. In some embodiments, the plurality of objects comprise a plurality of synthetic flowers and a vase, wherein the flowers are arrangeable within the vase and according to one or more patterns. In some embodiments, the plurality of objects comprise one or more of a basketball, a baseball, a soccer ball, an airplane, a boat, and a car. In further embodiments, the plurality of objects comprise a plurality of interlocking pieces configured to fit within a bottom of the storage device. In some of these embodiments, the plurality of interlocking pieces comprise a plurality of different shapes. In some embodiments, the plurality of objects comprise one or more of a round object, a jointed chain-like object, an object comprising one or more elastic tubes, and a puzzle. In some embodiments, the storage device comprises a bucket. In some of these embodiments, the plurality of objects comprise one or more of silicone, plastic and rubber.

In another aspect, a manipulation system for the stimulation of cognitive abilities comprises one or more arrangeable objects, the one or more arrangeable objects comprising one or more of a different sized object, a different shaped object, and a different textured object, wherein the one or more arrangeable objects are arrangeable according to one or more of size, shape and texture, one or more manipulative objects, the one or more manipulative objects comprising one or more of a bendable object and a stackable object and a storage bucket for removably holding the one or more arrangeable objects and the one or more manipulative objects when not being used. In some embodiments, the one or more arrangeable objects comprise one or more of a basketball, a baseball, a soccer ball, an airplane, a boat, a car, an animal and a tool. In further embodiments, the one or more arrangeable objects comprise a plurality of interlocking pieces. In some of these embodiments, the plurality of interlocking pieces comprise one or more tactile features. In some of these embodiments, the plurality of interlocking pieces comprise a plurality of different shapes. In further embodiments, the one or more arrangeable objects comprise one or more of a round object, an egg shaped object, a taco shaped object, a jointed chain-like object, an object comprising one or more elastic tubes and a puzzle. In some embodiments, the one or more manipulative objects comprise one or more of an object comprising one or more elastic tube, a segmented puzzle, a bendable ball, a bendable frisbee shaped object and a jointed chain-like object. In further embodiments, the one or more manipulative objects comprise a plurality of stackable items.

In a further aspect, a method of manufacturing a system for the stimulation of cognitive abilities comprises manufacturing one or more arrangeable objects, wherein the one or more arrangeable objects are arrangeable according to one or more of size, shape and texture, manufacturing one or more manipulative objects, manufacturing a storage bucket and placing the one or more arrangeable objects and the one or more manipulative objects in a bucket, wherein the storage bucket removably holds the one or more arrangeable objects and the one or more manipulative objects when they are not being used. In some embodiments, the one or more arrangeable objects comprise one or more of a different sized object, a different shaped object, and a different textured object. In some embodiments, the one or more manipulative objects comprise one or more of an elastic tube, a segmented puzzle, a bendable ball, a bendable frisbee shaped object and a jointed chain-like object. In further embodiments, the one or more manipulative objects comprise a plurality of stackable items.

DETAILED DESCRIPTION

Embodiments of the invention are directed to an object manipulation system comprising a storage device and a plurality of objects, which are configured to be placed within the storage device and separately taken from the storage device. The object manipulation system helps stimulate cognitive abilities of a user and provide quality of life moments without the need for supervision by allowing the user to arrange the items according to one or more arranging cues. The object manipulation system also helps stimulate blood flow of the hands and arms of the user and provides the added stimulating benefits of exercise and flexibility by enabling the user to bend and manipulate one or more manipulative devices of the system. Particularly, in some embodiments, the plurality of objects are bendable and are able to be bent and manipulated as the objects are taken from the storage device and arranged according to the one or more arranging cues. In some embodiments, one or more of the objects are jointed chain-like objects which make a clicking noise when bending.

Reference will now be made in detail to implementations of a manipulation system for the stimulation of cognitive abilities as illustrated in the accompanying drawings. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
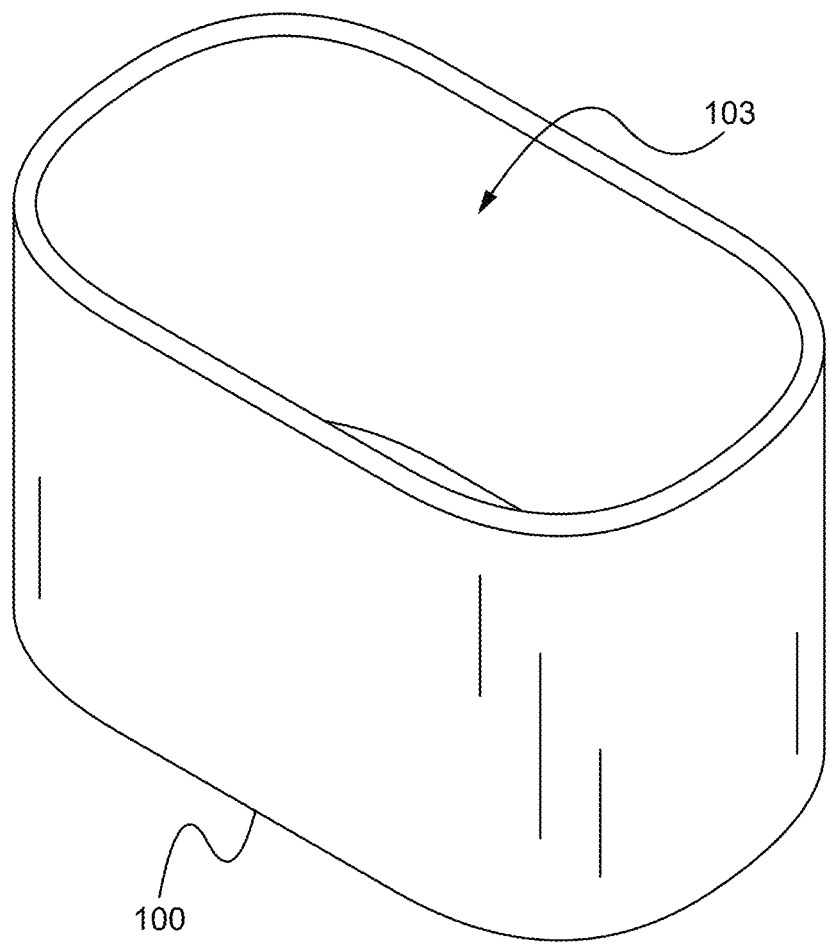
FIGS. 1A-1F illustrate a storage device for a plurality of object in accordance with some embodiments.
Figure 1B:
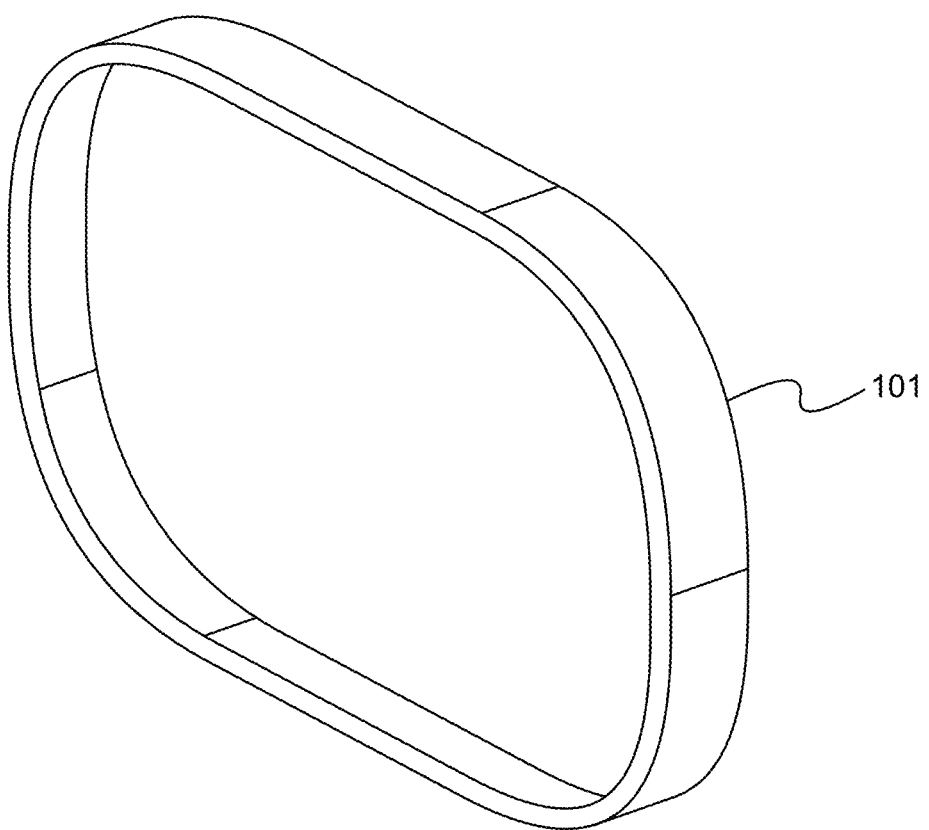
Figure 1C:
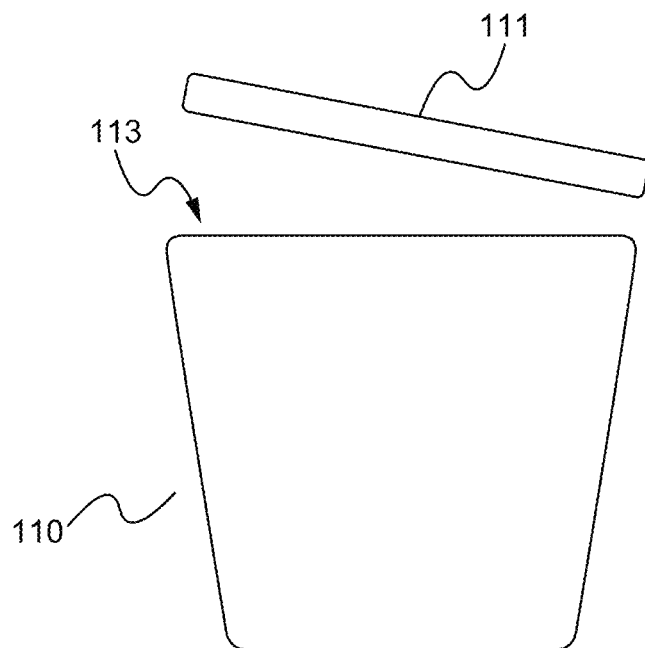

Referring now to FIGS. 1A-1C, a storage device 100 for storing a plurality of objects is depicted therein. In some embodiments, the storage device 100 comprises a silicone material. However, the storage device 100 is able to be constructed from any appropriately desired material. As shown within FIG. 1B, in some embodiments, the storage device 100 comprises a lid 101 which is opened to access an interior 103 of the storage device 100. In some embodiments, the storage device 100 comprises a plurality of pieces. In some embodiments, the storage device 100 comprises a handle.

The storage device 100 is able to be filled with a plurality of objects, such as flowers, shapes, sports themed objects, and other objects. The plurality of objects are configured to be placed within the storage device 100 and separately taken from the storage device 100. Particularly, in some embodiments, the storage device 100 comprises one or more shapes, or textures which correspond to the plurality of objects and enable a user to sort and/or arrange the objects according to the shapes and textures within the storage device 100.

As shown within FIG. 1C, the storage device such as described above comprises a silicone bucket 110. In some embodiments, such as shown within FIG. 1C, the storage device comprises a round and/or oval shaped bucket 110. As further shown within FIG. 1C, in some embodiments, the lid 111 is removable and/or separatable to access the interior 113 of the bucket 110.

As described above, bucket 110 is able to be filled with a plurality of objects, such as flowers, shapes, sports themed objects, and other objects. The plurality of objects are configured to be placed within the bucket 110 and separately taken from the bucket 110. Particularly, in some embodiments, the bucket 110 comprises one or more shapes or textures which correspond to the plurality of objects and enable a user to sort and/or arrange the objects according to the shapes and textures within the bucket 110.

Figure 1D:
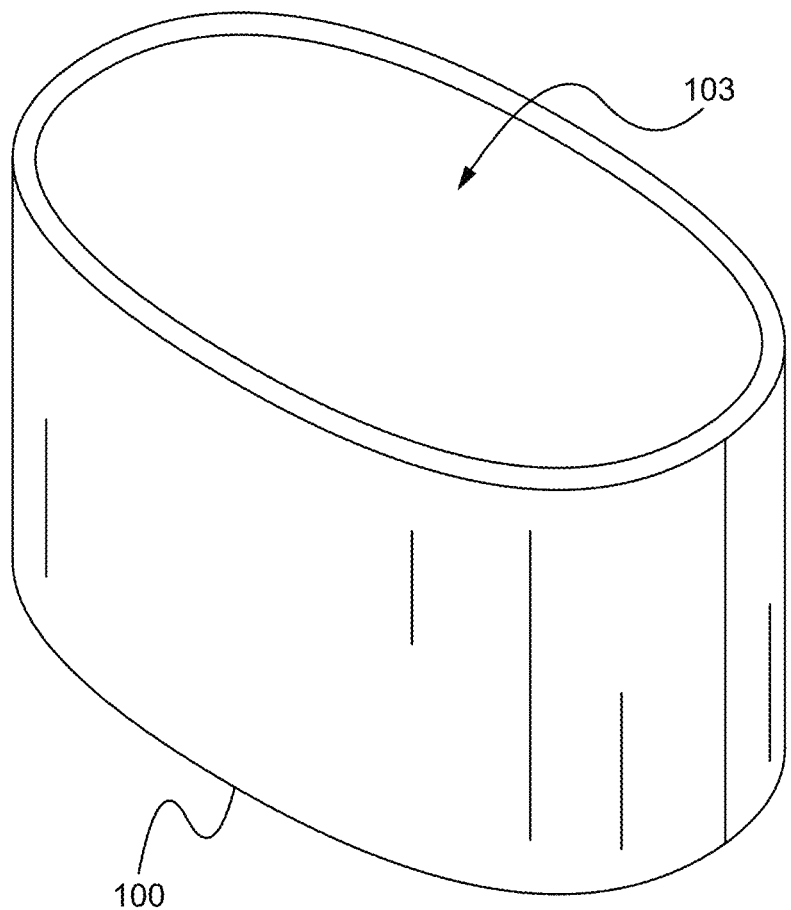
Figure 1E:
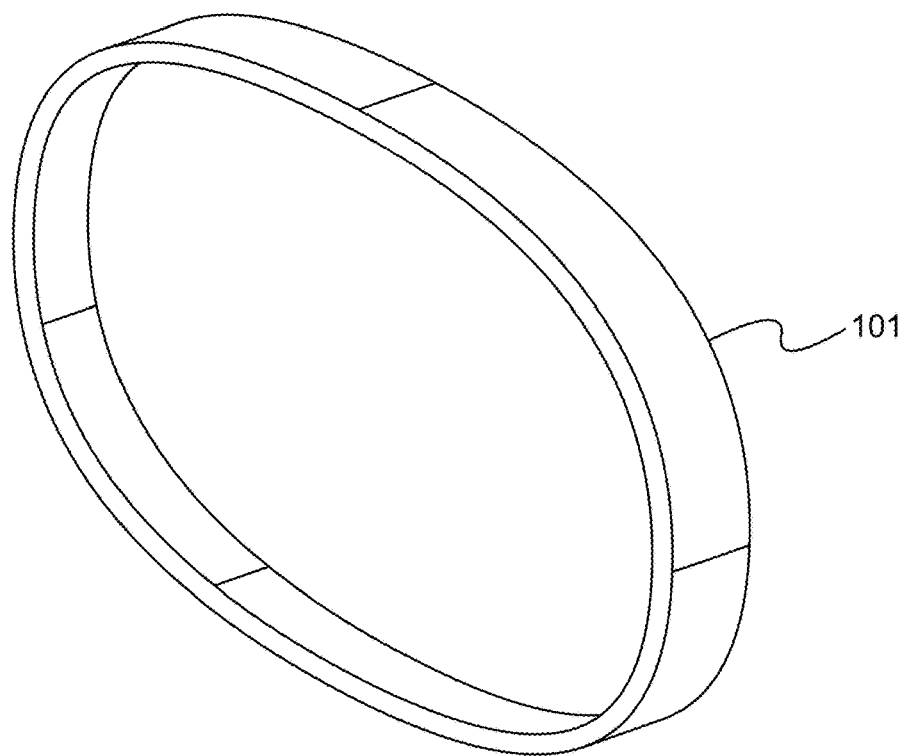
Figure 1F:
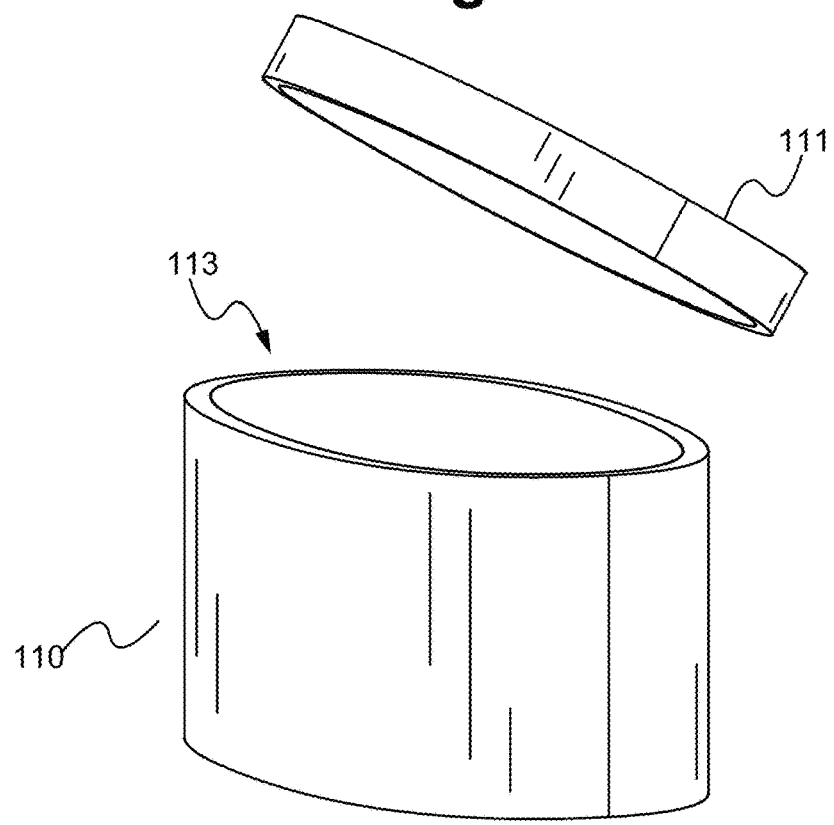

As further shown within FIGS. 1D-1F, the storage device 100' is able to comprise an angular shape at the corner of the bucket 110'. In some embodiments, the storage device 100' is configured to hold a plurality of objects, such as described above.

In some embodiments, the storage device 100' comprises a silicone material. However, the storage device 100 is able to be constructed from any appropriately desired material. As shown within FIG. 1E, in some embodiments, the storage device 100' comprises a lid 101' which is opened to access an interior 103' of the storage device 100'. In some embodiments, the storage device 100' comprises a plurality of pieces. In some embodiments, the storage device 100' comprises a handle.

The storage device 100' is able to be filled with a plurality of objects, such as flowers, shapes, sports themed objects, and other objects. The plurality of objects are configured to be placed within the storage device 100' and separately taken from the storage device 100'. Particularly, in some embodiments, the storage device 100' comprises one or more shapes or textures which correspond to the plurality of objects and enable a user to sort and/or arrange the objects according to the shapes and textures within the storage device 100'.

As shown within FIG. 1F, the storage device such as described above comprises a silicone bucket 110'. In some embodiments, such as shown within FIG. 1F, the storage device comprises comprise an angular shape at the corner of the bucket 110'. As further shown within FIG. 1F, in some embodiments, the lid 111' is removable and/or separatable to access the interior 113' of the bucket 110'.

As described above, bucket 110' is able to be filled with a plurality of objects, such as flowers, shapes, sports themed objects, and other objects. The plurality of objects are configured to be placed within the bucket 110' and separately taken from the bucket 110'. Particularly, in some embodiments, the bucket 110' comprises one or more shapes or textures which correspond to the plurality of objects and enable a user to sort and/or arrange the objects according to the shapes and textures within the bucket 110'. In some embodiments, the plurality of objects comprise one or more of silicone, plastic and rubber.

Figure 2A:
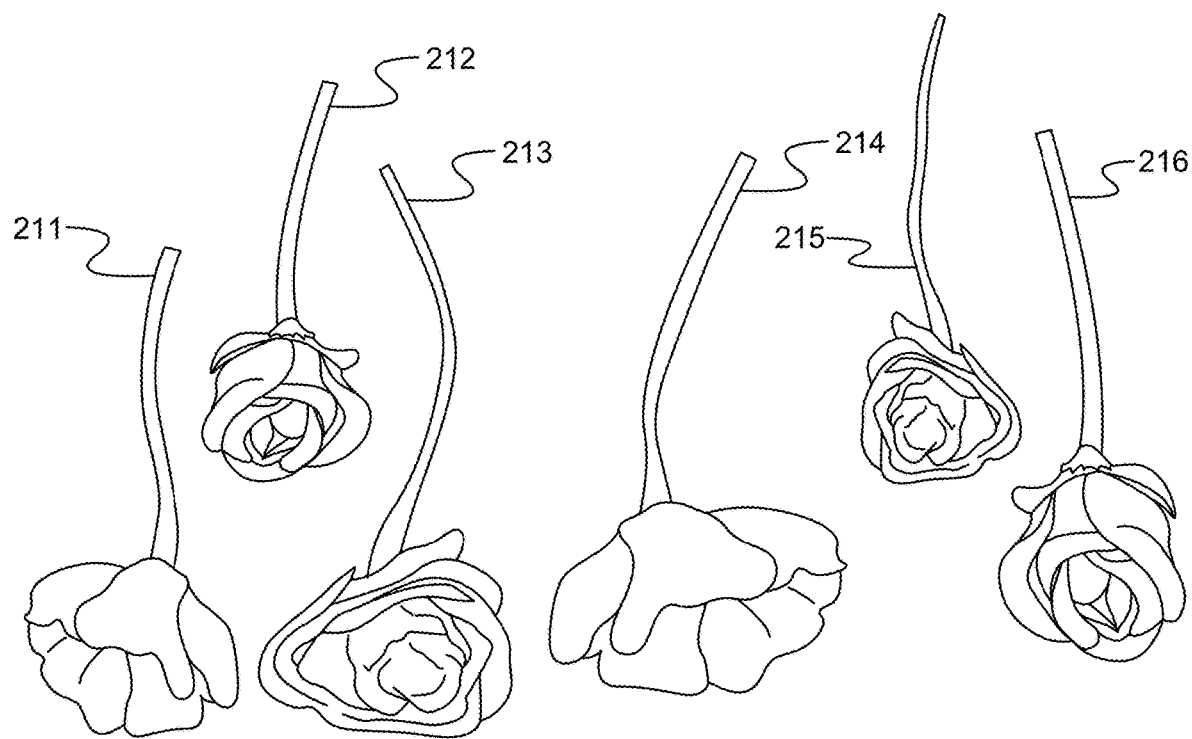
FIGS. 2A and 2B illustrate a plurality of objects configured to fit within a storage device in accordance with some embodiments.
Figure 2B:
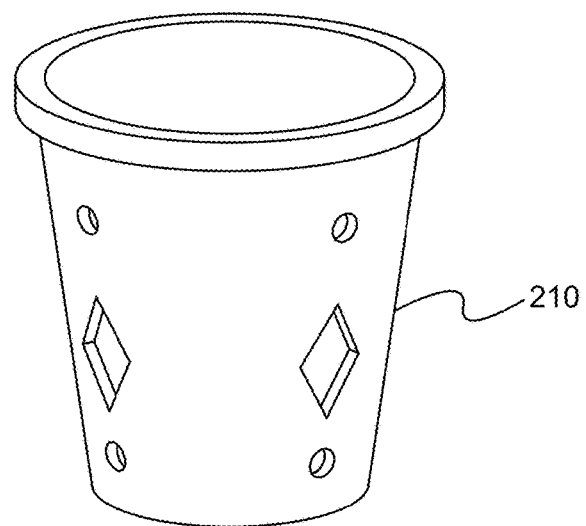

As shown within FIGS. 2A and 2B, in some embodiments the plurality of objects comprise a plurality of flowers 211, 212, 213, 214, 215, and 216 and a flower pot 210. In some embodiments, the flower pot 210 includes apertured of varying sizes. In some embodiments, the flower pot 210 is configured to hold five or six flowers. However, the vase 210 is configured to hold any appropriately desired number of flowers. In some embodiments, the flowers 211, 212, 213, 214, 215, and 216 comprise silicone, bendable plastic and/or rubber. In some embodiments, the plurality of flowers 211, 212, 213, 214, 215, and 216 and the flower pot 210 comprise one or more arranging cues which instruct a user to arrange the plurality of flowers 211, 212, 213, 214, 215, and 216 and the vase 210 according to a pattern. For example, in some embodiments, the flowers 211, 212, 213, 214, 215, and 216 are arrangeable according to size or some other quality. In some embodiments, the flowers 211, 212, 213, 214, 215, and 216 comprise different colors and/or different patterns. The plurality of flowers 211, 212, 213, 214, 215, and 216 and the flower pot 210 are configured to fit within the storage device 100, such as described above.

Figure 3:
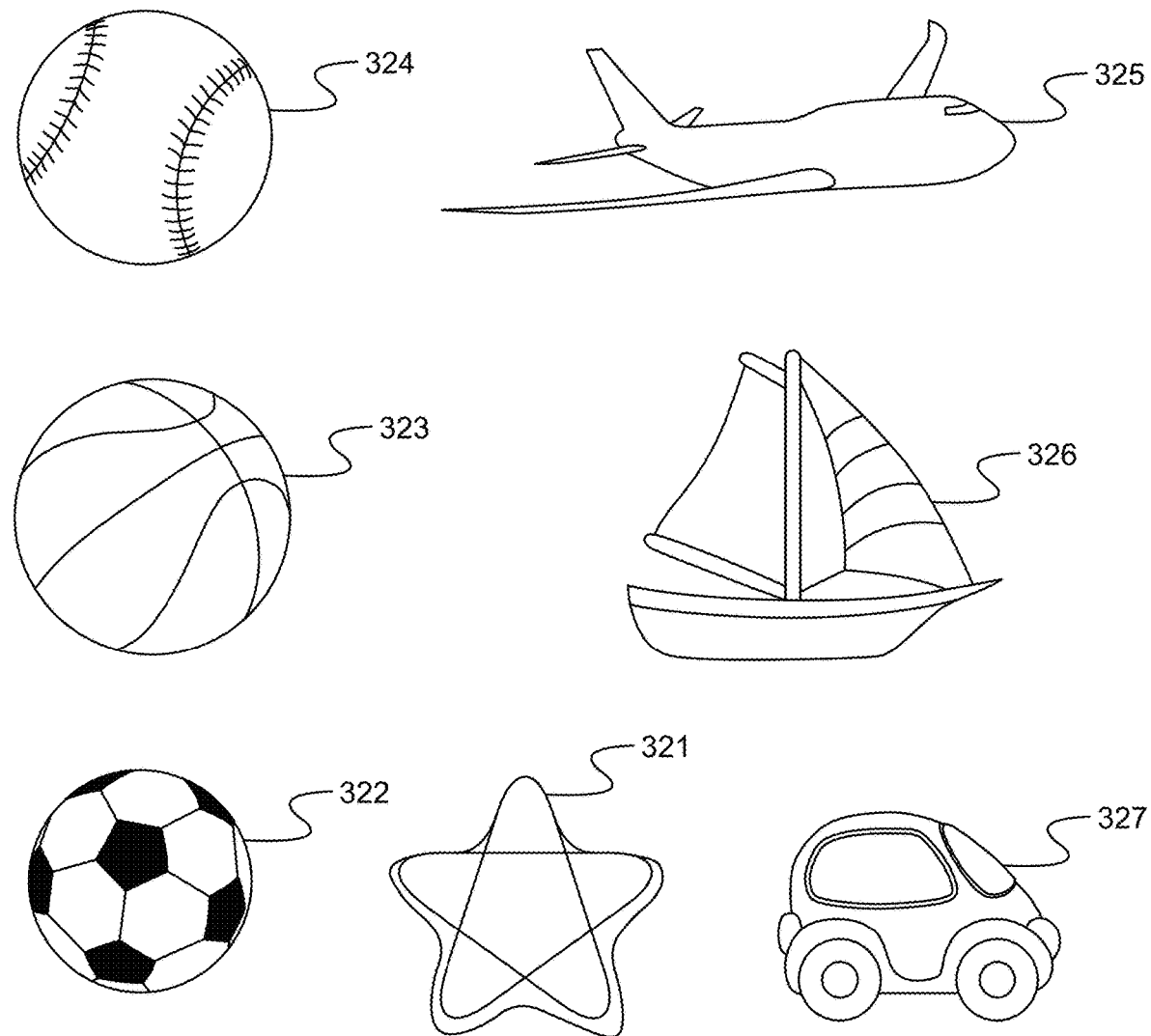
FIG. 3 illustrates a plurality of objects configured to fit within a storage device in accordance with some embodiments.

In further embodiments, such as shown within FIG. 3, the plurality of objects comprise a plurality of balls such as a soccer ball 322, a basketball 323, a baseball 324, and airplane 325, a boat 326, and a car 327. However, the plurality of objects can comprise other balls as well. For example, in some embodiments, the plurality of objects also comprise a star shaped ball 321. In some embodiments, the plurality of balls comprises one or more arranging cues which instruct a user to arrange the objects according to a determined pattern. The plurality of balls such as the soccer ball 322, the basketball 323, the baseball 324, and the airplane 325, the boat 326, and the car 327 are configured to fit within the storage device 100, such as described above. In some embodiments, the plurality of balls comprise silicone, bendable plastic and/or rubber.

Figure 4A:
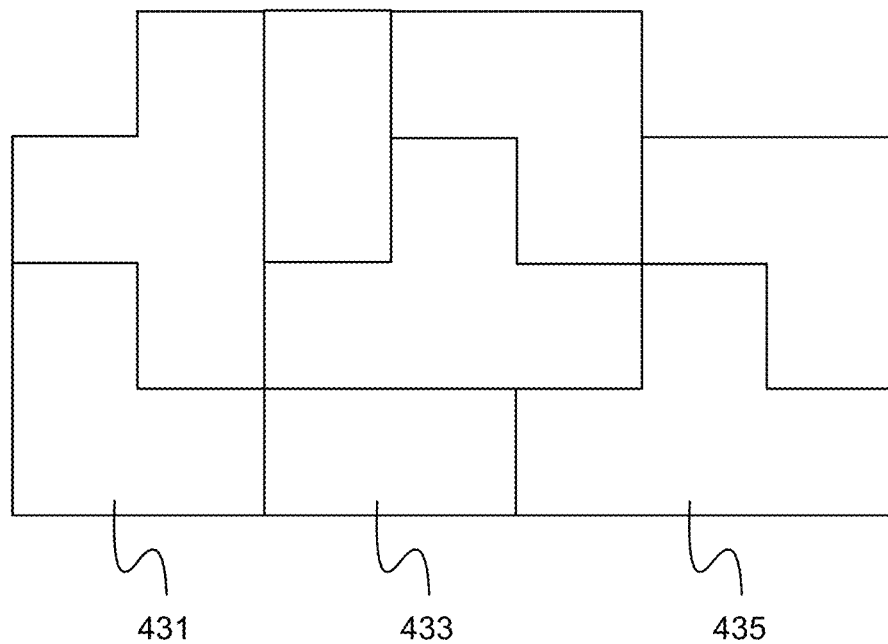
FIGS. 4A-4E illustrate a plurality of objects configured to fit within a storage device in accordance with some embodiments.
Figure 4B:
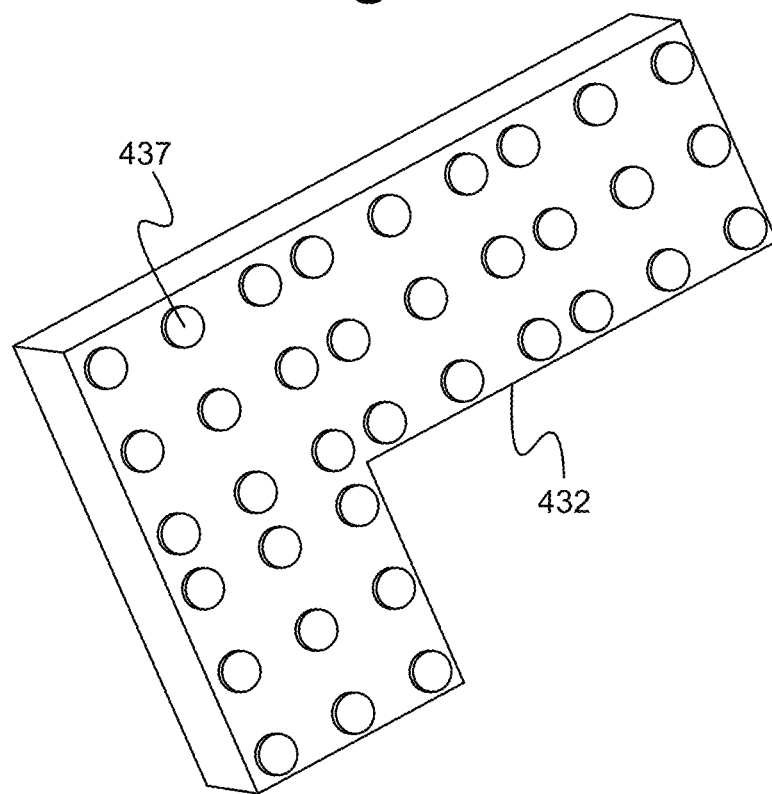
Figure 4C:
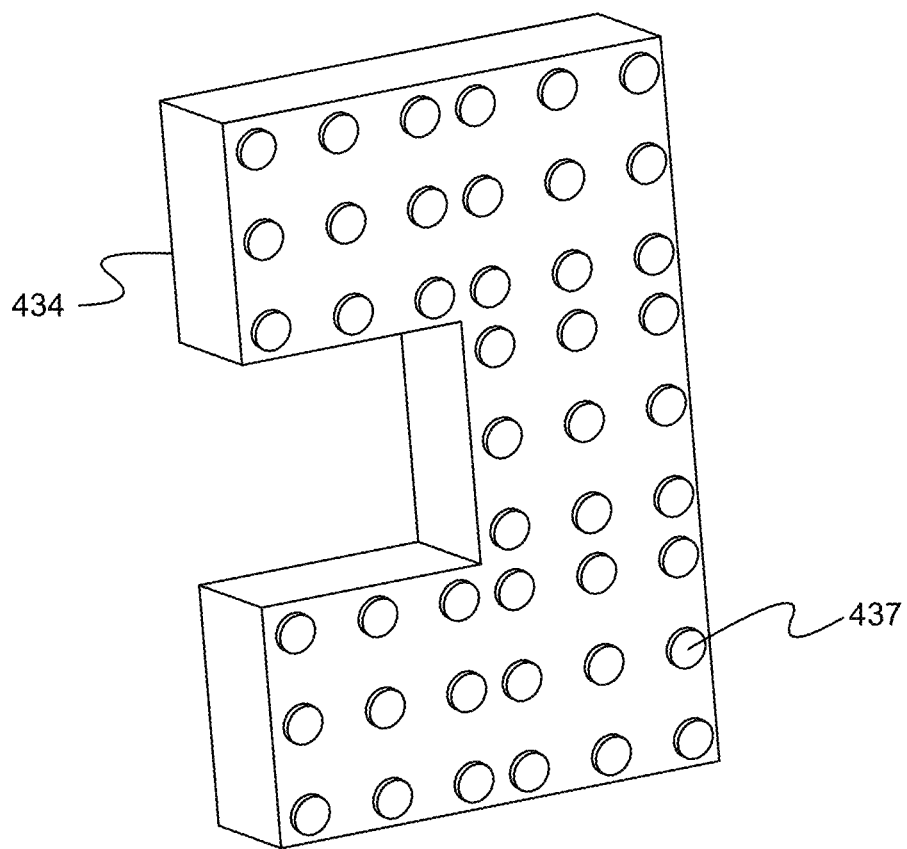
Figure 4D:
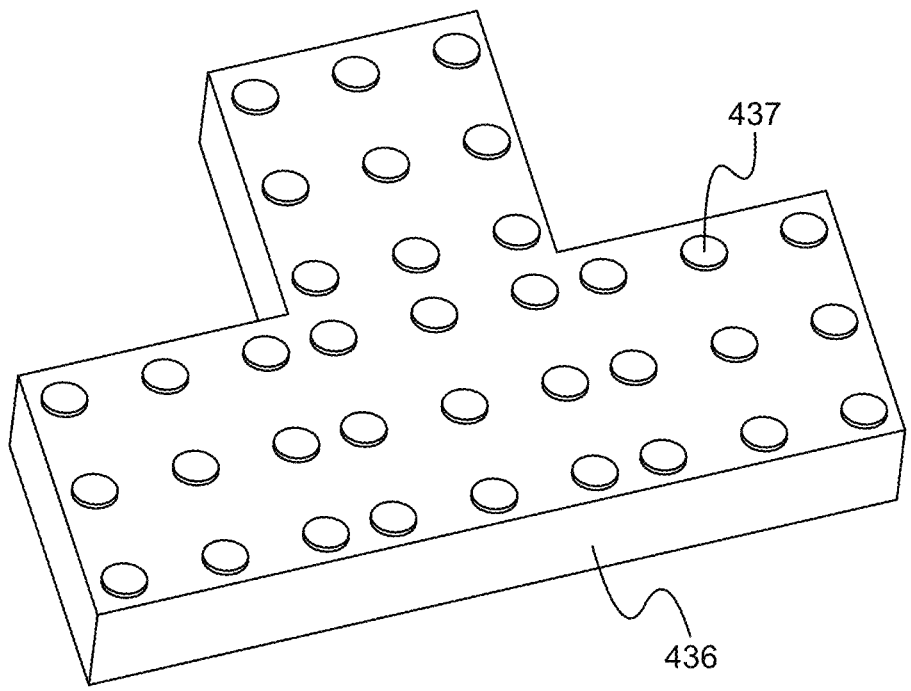
Figure 4E:
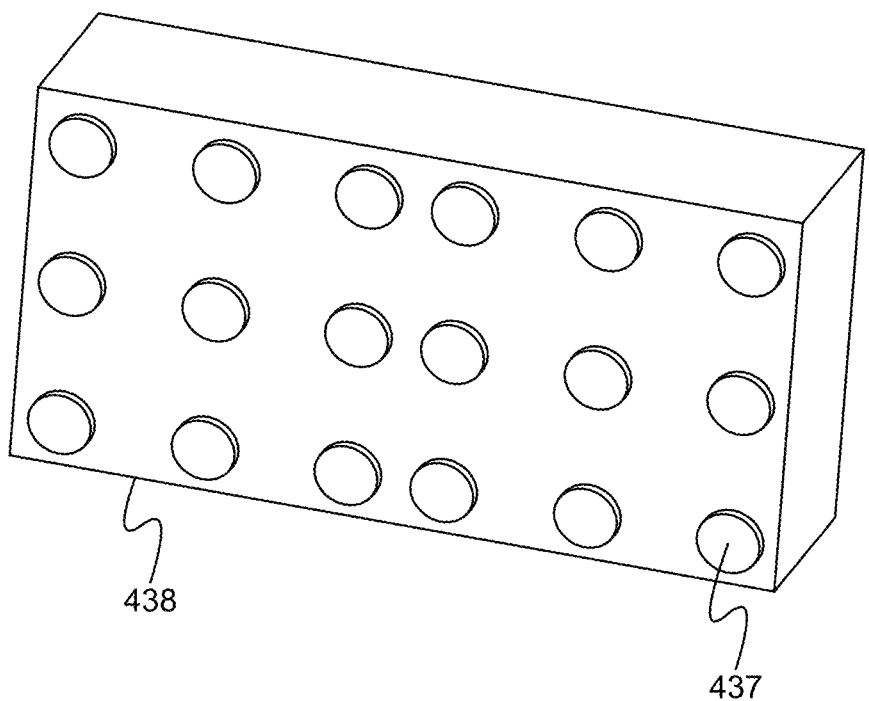

In some embodiments, the storage device 100 is configured to hold one or more interlocking pieces such as shown within FIG. 4A. As shown within FIG. 4A, in some embodiments, the one or more interlocking pieces 431, 433, and 435 comprise a plurality of different shapes. In some embodiments, the plurality of interlocking pieces comprise four shapes. In some embodiments, the plurality of interlocking pieces comprise four repeated shapes. Alternatively, in some embodiments the plurality of interlocking pieces comprise different shapes. In some embodiments, eight interlocking pieces are configured to fit within the storage device 100. However, any appropriately desired number of interlocking pieces are able to be fit within the storage device 100. In some embodiments, the plurality of interlocking pieces are configured to interlock and fit within a bottom of the storage device 100.

In some embodiments, such as shown in FIG. 4B-4E, a plurality of interlocking pieces 432, 434, 436 and 438 comprise tetris-like interlocking features. In some embodiments, the plurality of interlocking pieces 432, 434, 436 and 438 comprise one or more tactile features 437. For example, such as shown within FIG. 4B, the plurality of interlocking pieces 432, 434, 436 and 438 comprise a plurality of raised studs. However, the plurality of interlocking pieces 432, 434, 436 and 438 are able to comprise any appropriately desired tactile features. As described above, in some embodiments, the plurality of interlocking pieces comprise four repeated shapes. Alternatively, in some embodiments the plurality of interlocking pieces comprise different shapes. In some embodiments, eight interlocking pieces are configured to fit within the storage device 100. However, any appropriately desired number of interlocking pieces are able to be fit within the storage device 100. In some embodiments, the plurality of interlocking pieces are configured to interlock and fit within a bottom of the storage device 100. In some embodiments, the one or more interlocking pieces comprise silicone, bendable plastic and/or rubber.

Figure 5A:
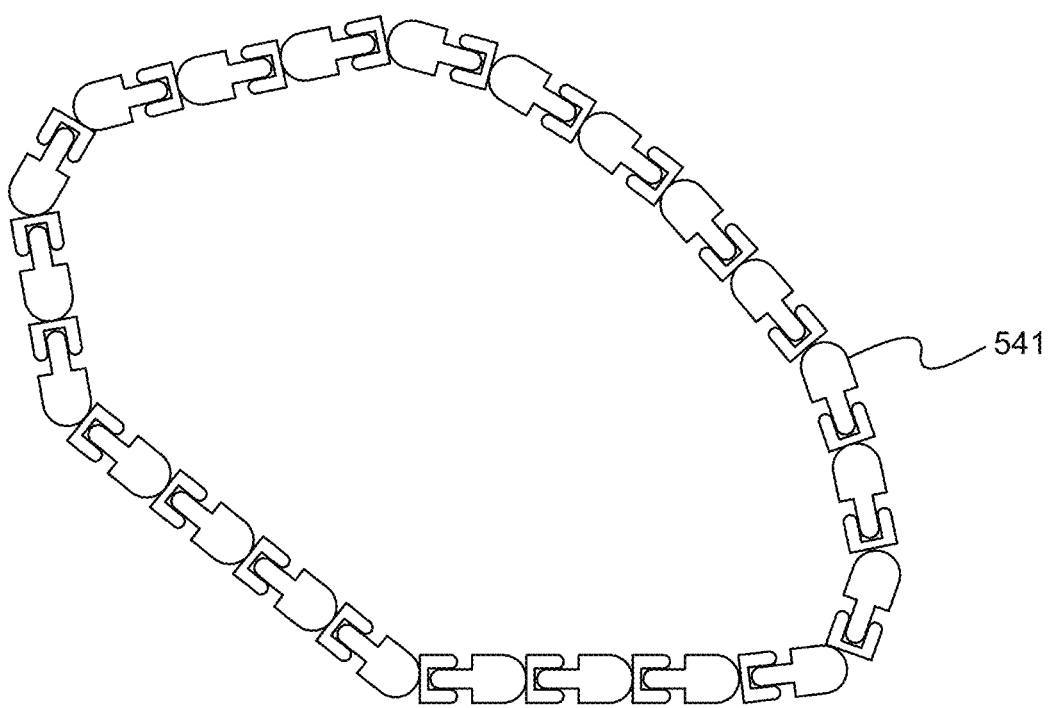
FIGS. 5A-5F illustrate a plurality of objects configured to fit within a storage device in accordance with some embodiments.

In further embodiments, a plurality of objects such as a round ball, a jointed chain-like object, a segmented puzzle, and an expanded puzzle are configured to be held by the storage device 100. For example, a segmented puzzle 541 is shown within FIG. 5A. The segmented puzzle 541 is able to folded and turned as it is held in the user's hands and is also able to be folded to form a variety of different shapes. In some embodiments, the segmented puzzle 541 comprises a jointed chain-like object that makes a clicking noise as it is bent. In some embodiments, this jointed chain-like object is configured to be used as a crown and/or a bracelet and is able to be manipulated. In some embodiments, the segmented puzzle 541 comprises hard plastic.

Figure 5B:
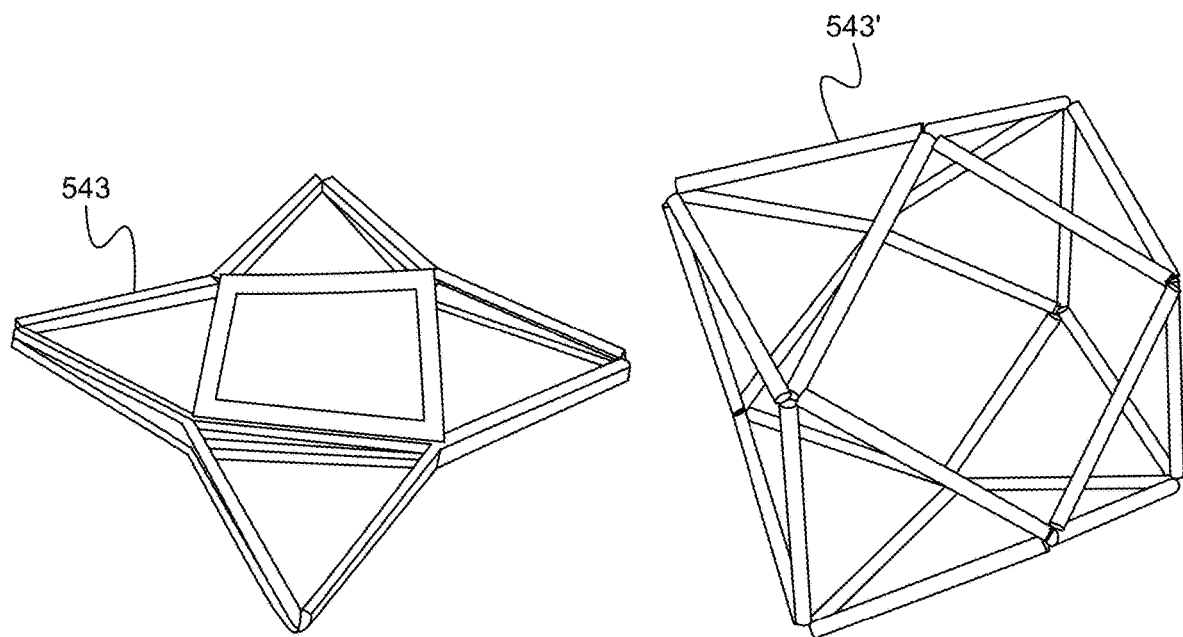
Figure 5C:
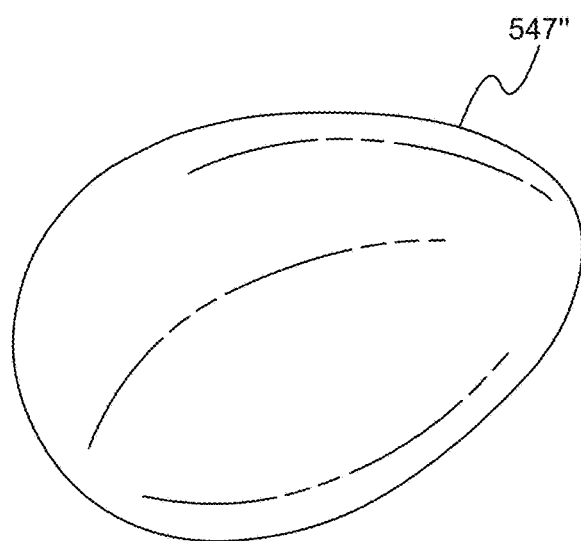
Figure 5D:
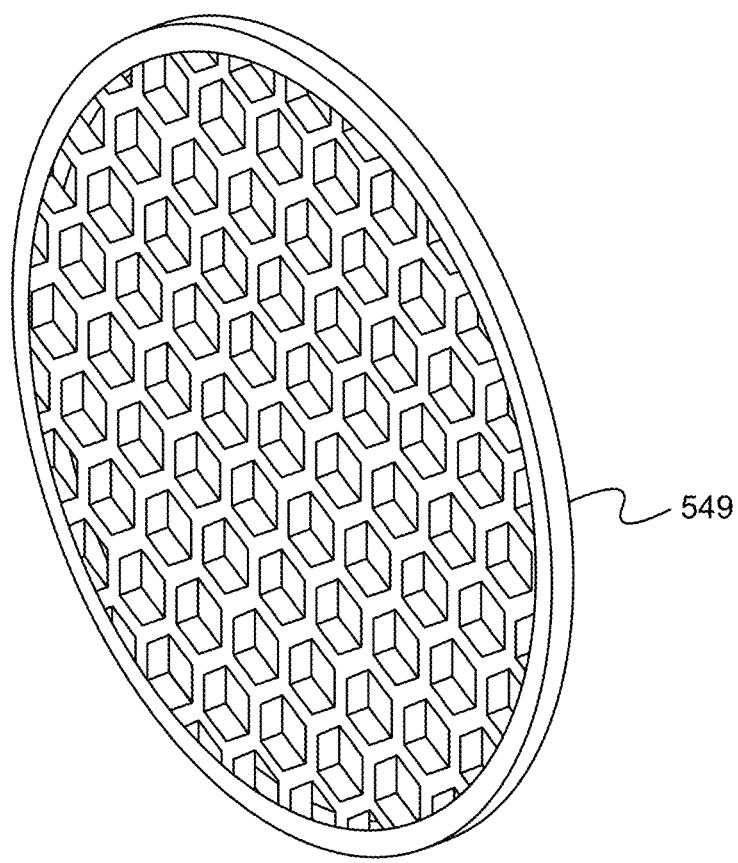
Figure 5E:
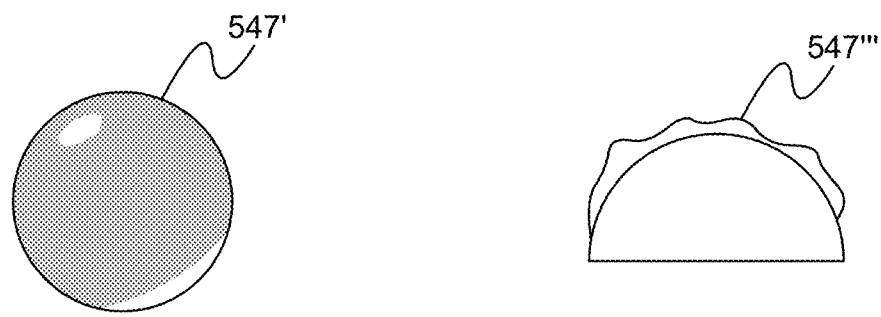
Figure 5F:
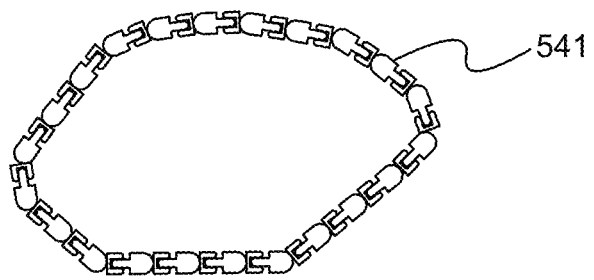

FIG. 5B shows an object comprising one or more elastic tubes 543. In some embodiments, the one or more elastic tubes are used for tugging and manipulating a shape of the object. In some embodiments, the object comprises an expanding puzzle which is able to expand 543' and retract 543 as the object is tugged and manipulated.

FIGS. 5C-5F illustrate a round ball 547', an egg shape 547", and a taco shape 547"'. In some embodiments, the ball 547 is bendable and can be collapsed and stretched while being held. In some embodiments, the ball 547 comprises foam and/or rubber. The bendable frisbee shaped object 549, the segmented puzzle 541, the object 543, and the round ball 547 are configured to fit within the storage device 100, such as described above. In some embodiments, the frisbee shaped object 549 comprises a silicone textured bendable frisbee.

Figure 6:
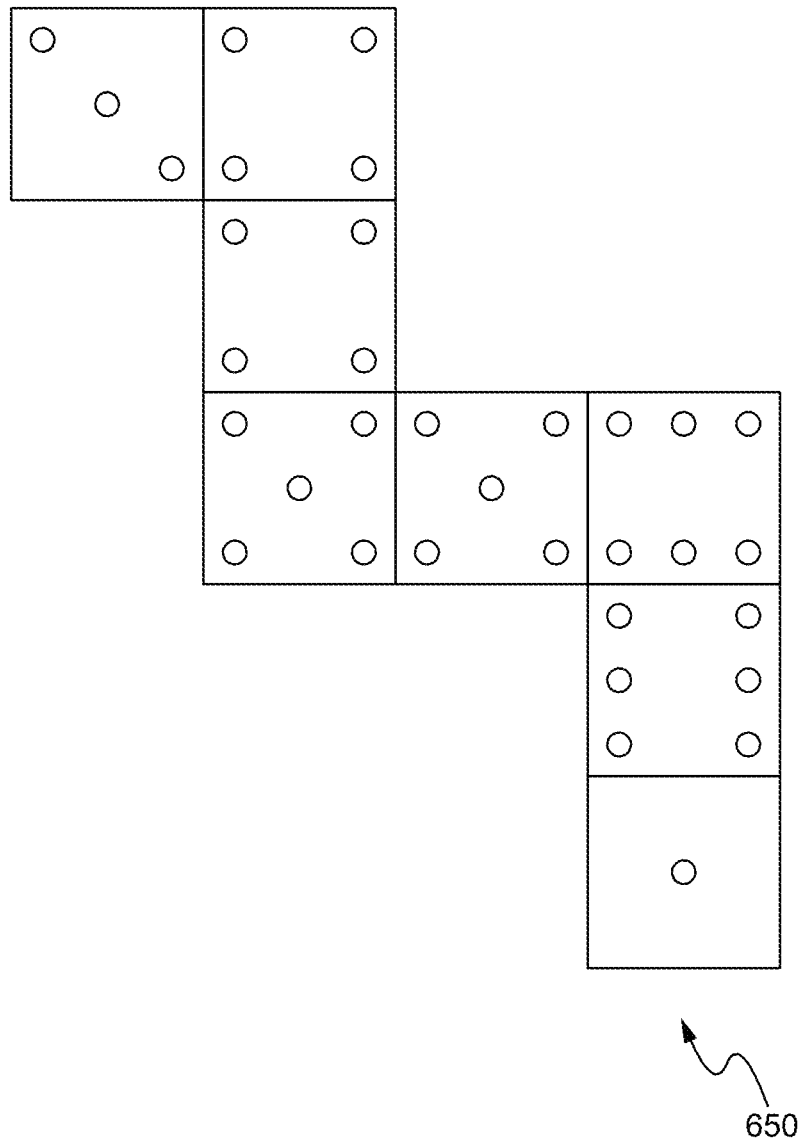
FIG. 6 illustrates a plurality of objects configured to fit within a storage device in accordance with some embodiments.

FIG. 6 illustrates a plurality of objects configured to fit within a storage device 100, such as described above. As shown within FIG. 6, the plurality of objects comprise a set of dominoes 650. In some embodiments, the dominoes comprise large silicone dominoes. In some embodiments, the dominoes are able to be stacked, bended and sorted as desired by a user. In some embodiments, the dominoes comprise silicone, bendable plastic and/or rubber.

Figure 7:
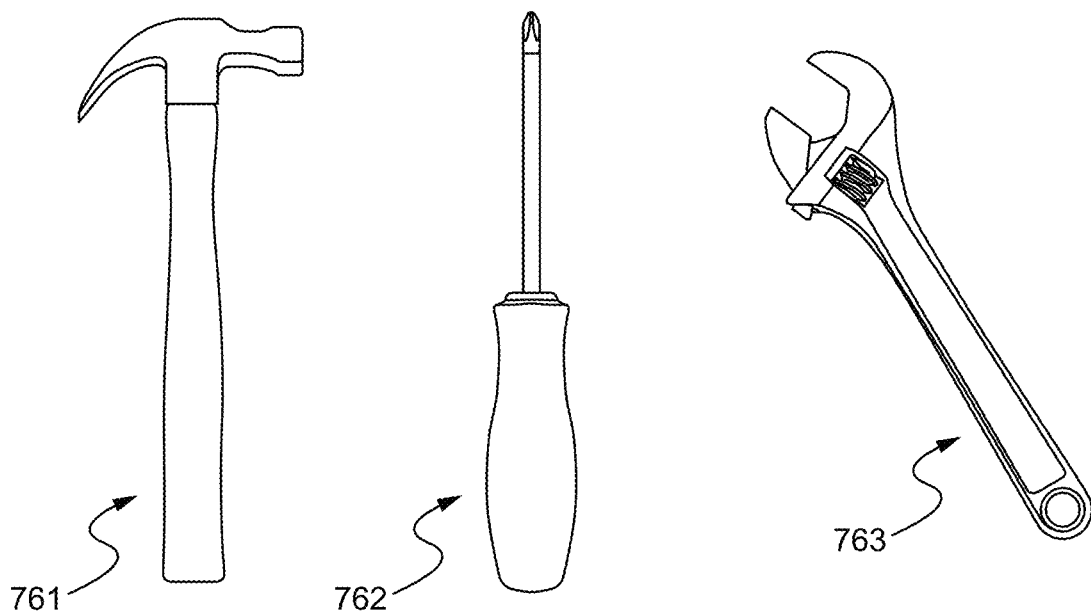
FIG. 7 illustrates a plurality of objects configured to fit within a storage device in accordance with some embodiments.

In further embodiments, a plurality of objects configured to fit within a storage device 100 comprise one or more silicone and/or plastic tools. For example, such as shown within FIG. 7, the plurality of objects comprise a hammer 761, a screwdriver 762 and a wrench 763. However, plurality of objects are able to comprise any number and types of tools as appropriately desired and capable of fitting within the storage device. In some embodiments, the tools comprise silicone, plastic and/or rubber.

Figure 8:
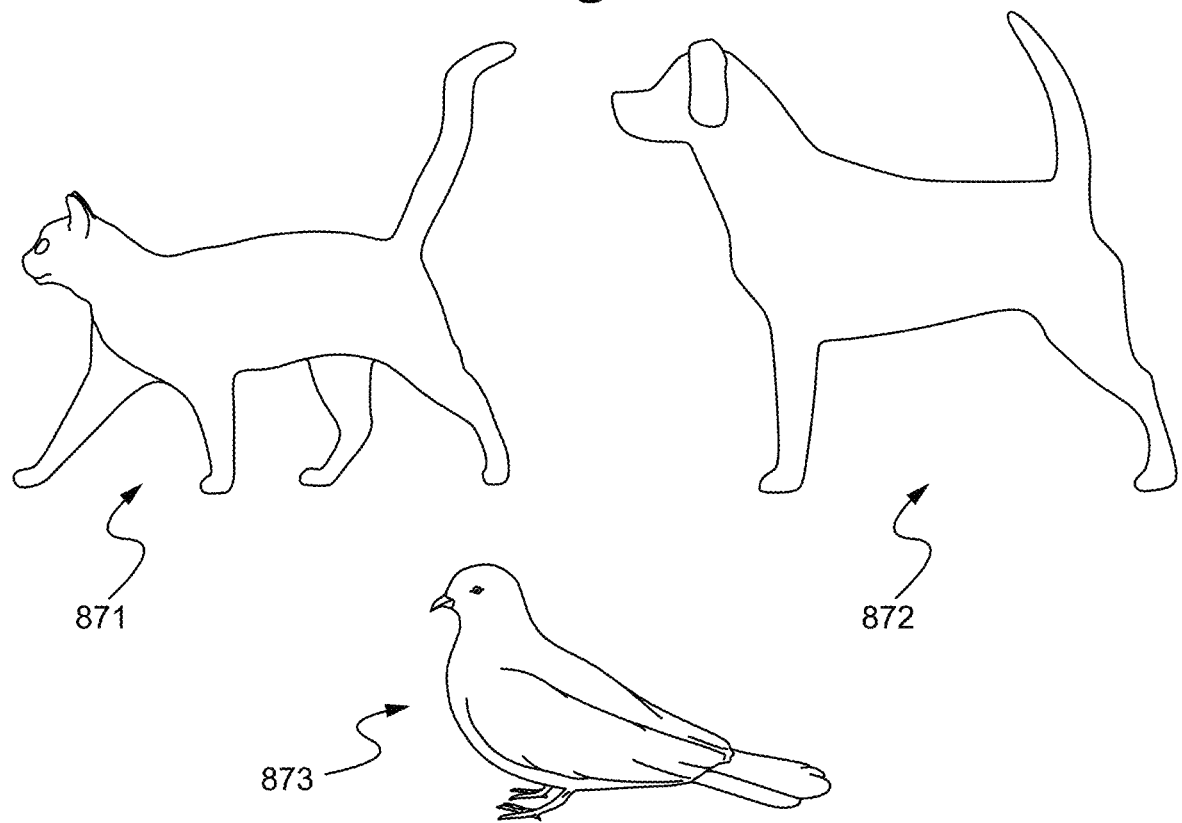
FIG. 8 illustrates a plurality of objects configured to fit within a storage device in accordance with some embodiments.

In still further embodiments, the plurality of objects configured to fit within a storage device 100 are able to comprise one or more animals. For example, such as shown within FIG. 8, the plurality of objects comprise a cat 871, a dog 872 and a bird 873. However, plurality of objects are able to comprise any number and types of animals as appropriately desired and capable of fitting within the storage device. In some embodiments, the cat 871, the dog 872 and the bird 873 comprise silicone, bendable plastic and/or rubber.

Figure 9:
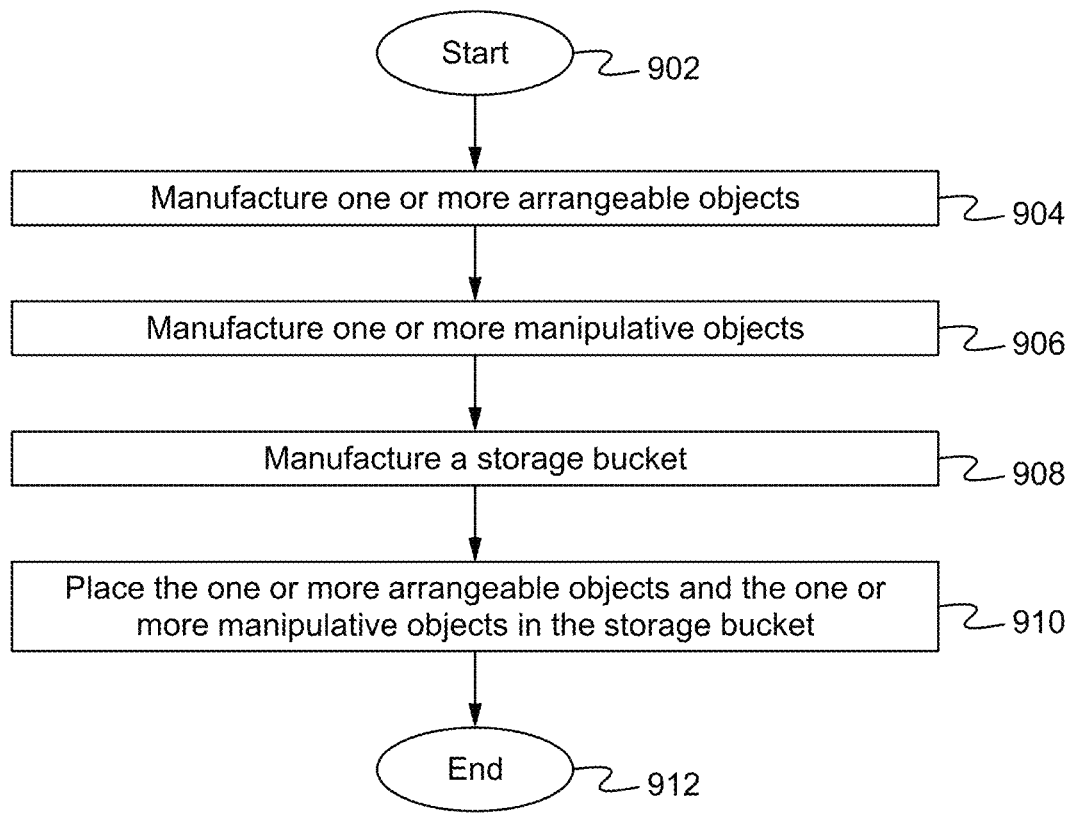
FIG. 9 illustrates a method of manufacturing a system for the stimulation of cognitive abilities in accordance with some embodiments.

FIG. 9 illustrates a method of manufacturing a system for the stimulation of cognitive abilities. The method begins in the step 902. In the step 904, one or more arrangeable objects are manufactured. In some embodiments, the one or more arrangeable objects are arrangeable according to one or more of size, shape and texture. In the step 906, one or more manipulative objects are manufactured and in the step 908 a storage bucket is manufactured. In the step 910, the one or more arrangeable objects and the one or more manipulative objects are placed in the storage bucket. In some embodiments, the storage bucket removably holds the one or more arrangeable objects and the one or more manipulative objects when they are not being used. In some embodiments, the one or more arrangeable objects comprise one or more of a different sized object, a different shaped object, and a different textured object. In some embodiments, the one or more manipulative objects comprise one or more of an elastic tube, a segmented puzzle, a bendable ball, a bendable frisbee shaped object and a jointed chain-like object. In further embodiments, the one or more manipulative objects comprise a plurality of stackable items. The method ends in the step 912.

In operation, a storage device is able to be filled with a variety of different objects such as flowers, balls, shapes, and bendable objects. The plurality of objects are able to be placed within the storage device and taken out of the storage device. Additionally, the plurality of objects are able to be arranged according to one or more arranging cues. Particularly, the storage device and the plurality of objects offers exercise for the hands and arms as well as provides sensory and memory stimulation to the user as the objects are arranged. Accordingly, the manipulation system as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

The invention claimed is:

1. An object manipulation system, the system comprising:
    a. a storage device; and
    b. a plurality of objects configured to be placed within the storage device and separately taken out of the storage device, wherein the plurality of objects are arrangeable according to one or more arranging cues, wherein the plurality of objects comprise a plurality of bendable flowers and a vase, wherein the flowers each have a different color and are arrangeable within the vase according to the different colors, wherein the vase comprises a plurality of apertures comprising a plurality of different sizes, one or more apertures of the plurality of apertures configured to receive one or more flowers of the plurality of flowers.

2. The system of claim 1, wherein the plurality of objects comprise one or more of a basketball, a baseball, a soccer ball, an airplane, a boat, and a car.

3. The system of claim 1, wherein the plurality of objects comprise one or more of a round object, an egg shaped object, a taco shaped object, a jointed chain-like object, an object comprising one or more elastic tubes and a puzzle.

4. The system of claim 1, wherein the plurality of objects comprise a plurality of soft dominoes.

5. The system of claim 1, wherein the plurality of objects comprise a plurality of tools.

6. The system of claim 1, wherein the plurality of objects comprise a plurality of animals.

7. The system of claim 1, wherein the storage device comprises a bucket.

8. The system of claim 1, wherein the plurality of objects comprise one or more of silicone, plastic and rubber.

9. The system of claim 1, wherein the one or more sorting cues comprise size, shape and texture.

10. A manipulation system for the stimulation of cognitive abilities, the system comprising:
    one or more arrangeable objects, the one or more arrangeable objects comprising one or more of a different sized object, a different shaped object, and a different textured object, wherein the one or more arrangeable objects are arrangeable according to one or more of size, shape and texture, wherein the one or more arrangeable objects comprise a plurality of bendable flowers and a vase, wherein the flowers each have a different color and are arrangeable within the vase according to the different colors, wherein the vase comprises a plurality of apertures comprising a plurality of different sizes, one or more apertures of the plurality of apertures configured to receive one or more flowers of the plurality of flowers.

11. The system of claim 10, wherein the one or more arrangeable objects comprise one or more of a basketball, a baseball, a soccer ball, an airplane, a boat, a car, an animal and a tool.

12. The system of claim 10, wherein the one or more arrangeable objects comprise one or more of a round object, an egg shaped object, a taco shaped object, a jointed chain-like object, an object comprising one or more elastic tubes and a puzzle.

13. A method of manufacturing a system for the stimulation of cognitive abilities, the method comprising:
    a. manufacturing one or more arrangeable objects, wherein the one or more arrangeable objects are arrangeable according to one or more of size, shape and texture, wherein the plurality of arrangeable objects comprise a plurality of bendable flowers and a silicone vase, wherein the flowers each have a different color and are arrangeable within the vase according to the different colors, wherein the silicone vase comprises a plurality of apertures comprising a plurality of different sizes, one or more apertures of the plurality of apertures configured to receive one or more flowers of the plurality of flowers;
    b. manufacturing one or more manipulative objects;
    c. manufacturing a storage bucket; and
    d. placing the one or more arrangeable objects and the one or more manipulative objects in the storage bucket, wherein the storage bucket removably holds the one or more arrangeable objects and the one or more manipulative objects when they are not being used, further wherein the plurality of interlocking pieces are configured to interlock and fit within the bucket.

14. The method of claim 13, wherein the one or more arrangeable objects comprise one or more of a different sized object, a different shaped object, and a different textured object.

15. The method of claim 13, wherein the one or more manipulative objects comprise one or more of an elastic tube, a segmented puzzle, a bendable ball, a bendable frisbee shaped object and a jointed chain-like object.

16. The method of claim 13, wherein the one or more manipulative objects comprise a plurality of stackable items.

* * * * *